United States Patent
Kunimasa et al.

(10) Patent No.: US 6,456,298 B1
(45) Date of Patent: Sep. 24, 2002

(54) IMAGE PROCESSING APPARATUS AND METHOD

(75) Inventors: Takeshi Kunimasa, Ebina (JP); Fumihiko Shibata, Ebina (JP); Kunihiko Kobayashi, Ebina (JP); Hiroshi Sekine, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/373,708

(22) Filed: Aug. 13, 1999

(30) Foreign Application Priority Data

Aug. 18, 1998 (JP) .......................................... 10-231759
Dec. 4, 1998 (JP) .......................................... 10-345458

(51) Int. Cl.$^7$ ................................................ G09G 5/30
(52) U.S. Cl. ....................... 345/629; 345/629; 345/630; 345/418; 345/419
(58) Field of Search ................................. 345/629, 630, 345/418, 419, 634

(56) References Cited

U.S. PATENT DOCUMENTS

| | | | | |
|---|---|---|---|---|
| 4,779,210 A | * | 10/1988 | Katsura et al. | 364/521 |
| 5,109,480 A | * | 4/1992 | Sone et al. | 395/131 |
| 5,262,767 A | * | 11/1993 | Takeda | 345/133 |
| 5,388,166 A | * | 2/1995 | Onozawa | 382/22 |
| 5,437,011 A | * | 7/1995 | Guttag et al. | 395/162 |
| 5,748,202 A | * | 5/1998 | Nakatsuka et al. | 345/514 |
| 5,768,489 A | * | 6/1998 | Adachi et al. | 395/117 |
| 6,184,860 B1 | * | 2/2001 | Yamakawa | 345/146 |

FOREIGN PATENT DOCUMENTS

| | | |
|---|---|---|
| JP | 6-274643 | 9/1994 |
| JP | 8-263674 | 10/1996 |
| JP | 10-51636 | 2/1998 |
| JP | 10-51651 | 2/1998 |

* cited by examiner

*Primary Examiner*—Matthew Luu
*Assistant Examiner*—Daniel J Chung
(74) *Attorney, Agent, or Firm*—Morgan, Lewis & Bockius LLP

(57) ABSTRACT

To provide an image processing apparatus and method that enable high speed and high quality image drawing process. When a drawing instruction including drawing logical arithmetic process instruction is input to a drawing instruction converting unit, the drawing instruction converting mans converts the input drawing instruction to a drawing object and a drawing logical arithmetic process instruction and then stores these to a drawing object storing unit. A drawing logical arithmetic process instruction determining unit determines whether the drawing logical arithmetic process instruction has content to be drawn without logical arithmetic process or not. As a result of determination, when the drawing logical arithmetic process instruction is determined to have content to be processed without drawing logical arithmetic process, the drawing object converting unit converts the determined drawing logical arithmetic process instruction and drawing object to the instruction and drawing object which do not require the drawing logical arithmetic process and transfers the subsequent processes to the other processing unit.

14 Claims, 14 Drawing Sheets

FIG. 9A

| D     | 1 | 1 | 0 | 0 |
|-------|---|---|---|---|
| S     | 1 | 0 | 1 | 0 |
| DSx   | 0 | 1 | 1 | 0 |
| SDSxx | 1 | 1 | 0 | 0 |

FIG. 9B

| D   | 0 | 0 |
|-----|---|---|
| S   | 1 | 0 |
| DSx | 1 | 0 |

FIG. 10

| COMMAND NAME | PARAMETER | |
|---|---|---|
| setattribute | c1 | VALUE OF R OF RGB COLOR SPACE |
|  | c2 | VALUE OF G OF RGB COLOR SPACE |
|  | c3 | VALUE OF B OF RGB COLOR SPACE |
|  | code | LOGICAL ARITHMETIC CODE |
| drawrect | x1 | x COORDINATE OF DIAGONAL POINT 1 |
|  | y1 | y COORDINATE OF DIAGONAL POINT 1 |
|  | x2 | x COORDINATE OF DIAGONAL POINT 2 |
|  | y2 | y COORDINATE OF DIAGONAL POINT 2 |
| drawellipse | x1 | x COORDINATE OF DIAGONAL POINT 1 OF CIRCUMSCRIBED RECTANGULAR SHAPE |
|  | y1 | y COORDINATE OF DIAGONAL POINT 1 OF CIRCUMSCRIBED RECTANGULAR SHAPE |
|  | x2 | x COORDINATE OF DIAGONAL POINT 2 OF CIRCUMSCRIBED RECTANGULAR SHAPE |
|  | y2 | y COORDINATE OF DIAGONAL POINT 2 OF CIRCUMSCRIBED RECTANGULAR SHAPE |
| startclip | NONE | |
| endclip | NONE | |

FIG. 11

| LOGICAL ARITHMETIC PROCESS | CODE |
|---|---|
| 0 | 1 |
| DSon | 2 |
| DSna | 3 |
| DSn | 4 |
| DSna | 5 |
| Dn | 6 |
| DSx | 7 |
| DSan | 8 |
| DSa | 9 |
| DSxn | 10 |
| D | 11 |
| DSno | 12 |
| S | 13 |
| SDno | 14 |
| DSo | 15 |
| 1 | 16 |

FIG. 12A

| | | | | | |
|---|---|---|---|---|---|
| 1 | setattribute | 30 | 30 | 30 | 7 |
| 2 | drawrect | 50 | 10 | 70 | 90 |
| 3 | setattribute | 60 | 60 | 60 | 7 |
| 4 | drawrect | 70 | 10 | 90 | 90 |
| 5 | setattribute | 90 | 90 | 90 | 7 |
| 6 | drawrect | 90 | 10 | 110 | 90 |
| 7 | setattribute | 120 | 120 | 120 | 7 |
| 8 | drawrect | 110 | 10 | 130 | 90 |
| 9 | setattribute | 160 | 160 | 160 | 7 |
| 10 | drawrect | 130 | 10 | 150 | 90 |
| 11 | setattribute | 0 | 0 | 0 | 13 |
| 12 | drawellipse | 60 | 20 | 140 | 80 |
| 13 | setattribute | 30 | 30 | 30 | 7 |
| 14 | drawrect | 50 | 10 | 70 | 90 |
| 15 | setattribute | 60 | 60 | 60 | 7 |
| 16 | drawrect | 70 | 10 | 90 | 90 |
| 17 | setattribute | 90 | 90 | 90 | 7 |
| 18 | drawrect | 90 | 10 | 110 | 90 |
| 19 | setattribute | 120 | 120 | 120 | 7 |
| 20 | drawrect | 110 | 10 | 130 | 90 |
| 21 | setattribute | 160 | 160 | 160 | 7 |
| 22 | drawrect | 130 | 10 | 150 | 90 |

- Lines 1–10: GRADATION FIGURE, EXCLUSIVE LOGICAL ARITHMETIC PROCESS
- Lines 11–12: DRAWING OF A FIGURE IN THE COLOR WHERE VALUE IS 0 (OVERWRITING OF ELLIPTICAL SHAPE)
- Lines 13–22: GRADATION FIGURE, EXCLUSIVE LOGICAL ARITHMETIC PROCESS

FIG. 12B

| | | | | | |
|---|---|---|---|---|---|
| 1 | startclip | | | | |
| 2 | drawellipse | 60 | 20 | 140 | 80 |
| 3 | endclip | | | | |
| 4 | setattribute | 30 | 30 | 30 | 13 |
| 5 | drawrect | 50 | 10 | 70 | 90 |
| 6 | setattribute | 60 | 60 | 60 | 13 |
| 7 | drawrect | 70 | 10 | 90 | 90 |
| 8 | setattribute | 90 | 90 | 90 | 13 |
| 9 | drawrect | 90 | 10 | 110 | 90 |
| 10 | setattribute | 120 | 120 | 120 | 13 |
| 11 | drawrect | 110 | 10 | 130 | 90 |
| 12 | setattribute | 160 | 160 | 160 | 13 |
| 13 | drawrect | 130 | 10 | 150 | 90 |

- Lines 1–3: DESIGNATING A CLIP AREA (DESIGNATING AN ELLIPTICAL SHAPE)
- Lines 4–13: GRADATION FIGURE, OVERWRITING IN THE CLIP AREA

IMAGE PROCESSING APPARATUS AND METHOD

BACKGROUND OF THE INVENTION

1. Field of the Invention

The present invention relates to an image processing apparatus and method to perform the process by receiving a drawing instruction output, for example, from an image generating apparatus and particularly by receiving a drawing instruction including a designation for logical arithmetic process between pixels forming an image.

2. Description of the Related Art

In an image forming system in which various drawing instructions output from an image generating apparatus such as a personal computer are processed and these instructions are developed to image data expressed by arrangement of pixels to be printed by a printing device, various processes are performed depending on the drawing instruction while such drawing instructions are received and then developed to image data. It is one of the processes to overlap both images depending on the instruction of the method for overlapping an image to be newly written on the old image on the occasion of drawing a plurality of images at the overlapping position. The image overlapping method to-be instructed is generally instructed as a kind of the logical arithmetic processes such as logical sum, logical product and exclusive original sum. Such logical arithmetic process between images is generally known as ROP (Raster operation).

The ROP process is generally complicated and requires a longer processing time and also requires many memories for execution. Particularly, in order to express only one effect, many application programs exist in order to output a command combining a plurality of ROP processes. Instruction combining such ROP processes has been a factor for increasing the processing time required until an image is printed by the printing device.

Usually, 16 to 256 kinds of ROP processes are provided. However, these ROP processes are not always used in general and the limited kinds of processes are often used depending on the characteristic combination by the application programs.

As an example of combination of the ROP processes, the process to completely paint the internal side of the desired shape with gradation may be listed by the ROP process of three steps. In the step 1 of this process, the original pixels in the rectangular shape area including the desired shape and total painting pattern of gradation are calculated through the ROP process of exclusive sum (XOR) and are drawn as the pixels of target area. In the next step 2, white and black mask pattern indicating the desired shape and pixels of the target area are calculated by the ROP process of the logical product (AND) and are drawn as the pixels of the target area. As a result, the internal side of the desired shape may be replaced with the black pixels of the mask pattern, while the external side is expressed by logical sum with the white pixels. As a result, the external side remains as the original pixel values. In the final step 3, the pixels of the same rectangular shape as the step 1 and the complete painting pattern of gradation are calculated again by the ROP process of the exclusive logical sum (XOR) and are drawn as the pixels of the target area. As a result, the part completely painted by black in the step 2, namely the internal side of the desired shape is completely painted by the gradation pattern as the first object and the external side is returned to the condition before starting the ROP process in the step 3.

In order to completely paint the internal side of the desired shape as explained above with the particular pattern, the ROP process must be executed for three times in total. Therefore, considerable processing time is required. Therefore, as is described in the Japanese Published Unexamined Patent Application No. Hei 8-263674, it is thought that the characteristic pattern of such ROP process is detected, the number of steps of ROP process is reduced and such process is replaced with more simplified ROP process. In the method disclosed in this reference, the first step among the ROP process of three steps is completely omitted and the mask pattern of the step 2 and gradation pattern of step 3 are previously subjected to the logical product and the result is then written to the target area. Thereby, the number of times of the ROP process can be reduced to realize high speed process.

In the example explained above, high speed process has been realized by avoiding the step 1 among the ROP process of three steps, but the ROP process is also executed as is determined. Moreover, combination pattern of the other ROP processes is not described and high speed operation is also expected for the other combination of the ROP processes.

Meanwhile, the ROP process explained above has been thought for display on the display unit of a personal computer and the pixel data as the object of the logical arithmetic process is based on expression in the RGB color space. In an ordinary printing device, the CMYK color space is finally used and it is different from a color space on which the ROP process is based. The ROP process cannot be executed correctly in the color space in which the K color element is not primarily independent, depending on the other C, M, Y color element as in the case of the CMYK color space. Therefore, when the ROP process is executed for the pixels expressed by the CMYK color space, the result which is different from that obtained when such ROP process is executed to the pixels in the RGB color space can be obtained.

Accordingly, as a method of executing in correct the ROP process, the ROP process is executed, for example, while the image data expressed in the RGB color space is developed first to the pixel data while it is the RGB color space. The image data in a page is all developed to the image data and after the ROP process is completed, all pixels in one page are converted at a time to the CMYK color space. However, in this method, the pixel data expressed in the RGB color space must be color-converted to the pixels in the CMYK color space in unit of pixel. As a result, much processing time is required for color conversion. Moreover, since uniform color conversion is executed not depending on a kind of image data expressed by the original drawing command, color conversion parameter suitable for a kind of pixel data cannot be selected and thereby a problem of image quality may also be generated.

For the method explained above, also considered is the method where the image data developed to the pixel data in the CMYK color space is converted in the CMY color space or RGB color space as much as required for ROP process, thereafter the ROP process is executed and only the part converted in the CMY color space or RGB color space is converted again in the CMYK color space. According to this method, higher speed process can be expected in comparison with the conversion of the pixels in the CMYK color space once developed in the RGB space as explained above. Moreover, correct ROP process may be enabled in comparison with the direct process in the CMYK color space. However, since conversion to the CMY color space or RGB color space from the CMYK color space is not conducted in one to one basis and color value after the conversion is never determined uniquely. Therefore, even when the part which is once converted to the CMY color space or RGB color space for the ROP process is converted again to the CMYK color space, the pixel value is not always returned to the original value. Therefore, in some cases, color difference may be generated, when conversion is conducted again to the CMYK color space after the ROP process, at the area between the part where the ROP process is executed and its peripheral part where the ROP process is not yet executed.

As explained above, discrepancy on color reproduction may be generated, when the ROP process is executed, in some cases due to the color conversion process followed by the ROP process. In order to avoid such discrepancy, it is requested to avoid the ROP process as much as possible.

SUMMARY OF THE INVENTION

Considering the background explained above, an object of the present invention is to provide an image processing apparatus and method that enable high speed and high quality image drawing process.

The present invention is characterized in determining whether the drawing logical arithmetic process instruction in the drawing instruction has the content which may be processed or not without execution of the logical arithmetic process and converting one or a plurality of continuous drawing logical arithmetic process instruction and drawing objects having the content which may be processed without logical arithmetic process into the instruction and drawing object which do not require the drawing logical arithmetic process. Therefore, since it is no longer required to execute unnecessary drawing logical arithmetic process, high speed and high image quality drawing process may be enabled.

BRIEF DESCRIPTION OF THE DRAWINGS

FIGS. 9A and 9B are diagrams for explaining result of arithmetic process of exclusive logical sum (XOR);

FIG. 10 is a diagram for explaining an example of a page description language;

FIG. 11 is a diagram for explaining an example of logical arithmetic codes used in the page description language;

FIGS. 12A and 12B are diagrams for explaining an example of drawing instruction group for drawing the third practical embodiment;

DESCRIPTION OF THE PREFERRED EMBODIMENTS

Figure 1:
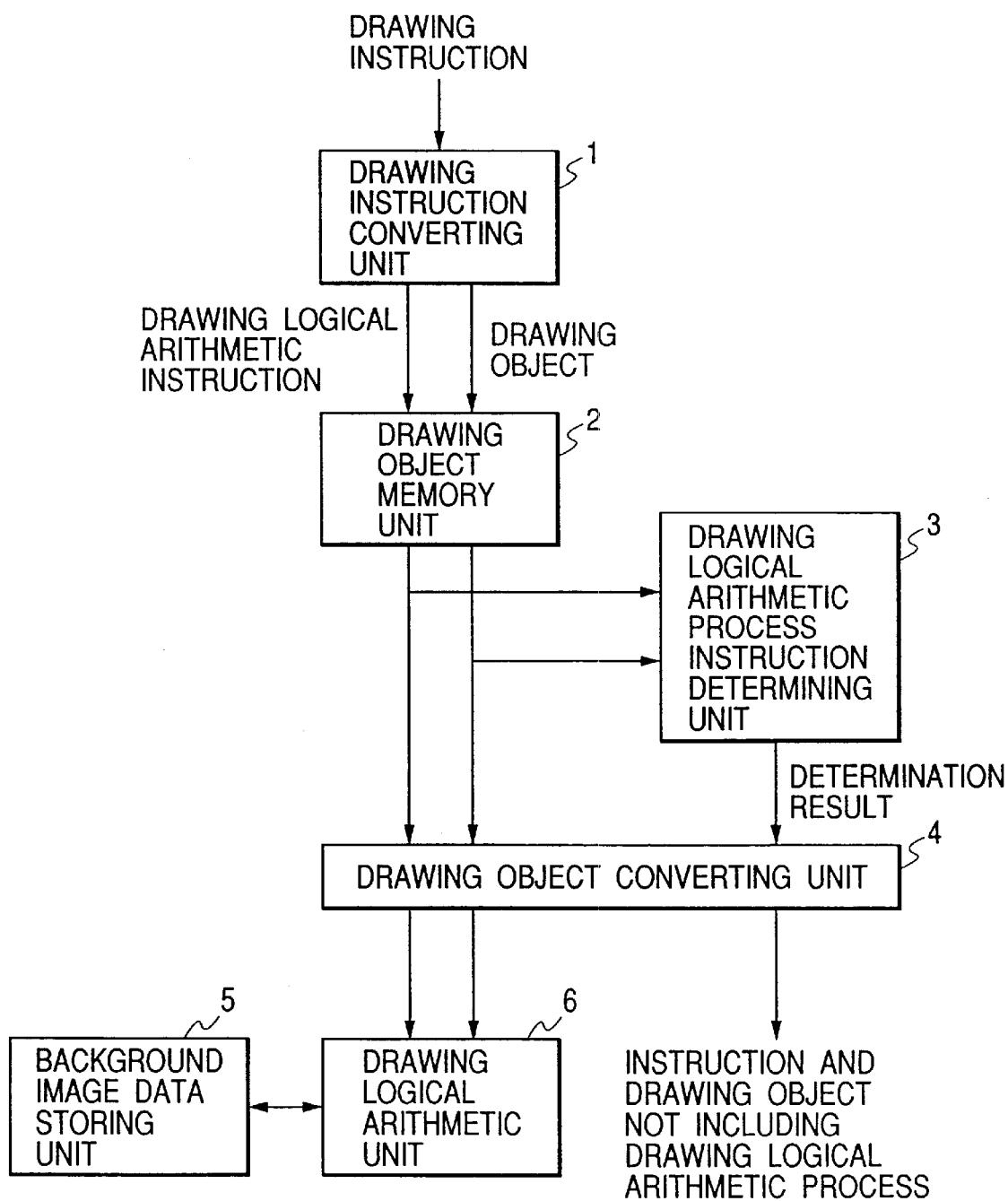
FIG. 1 is a block diagram illustrating a preferred embodiment of the present invention.

FIG. 1 is a block diagram illustrating an embodiment of the present invention. In this figure, reference numeral 1 designates a drawing instruction conversion unit; 2, a drawing object memory unit; 3, a drawing logical arithmetic process instruction determination unit; 4, a drawing object conversion unit; 5, a background image data storing unit; and 6 is a drawing logical arithmetic processing unit.

The drawing instruction conversion unit 1 receives a drawing instruction including the instruction for the logical arithmetic process between the pixels forming an image and then converts this instruction to a drawing object and a drawing logical arithmetic process instruction. The drawing object is composed of at least one or more background patterns for defining a mask pattern to define the shape and a complete painting pattern. Moreover, as the logical arithmetic process instruction, any one of the ROP processes which are well known in the related art may be designated.

The drawing object memory unit 2 memorizes the drawing object and drawing logical arithmetic process instruction converted in the drawing instruction conversion unit 1. It is also possible to introduce the structure where this drawing object memory unit 2 is not arranged, but when a plurality of continuous drawing logical arithmetic process instructions are determined in the drawing logical arithmetic process instruction determination unit 3 as will be explained later, it is convenient to previously memorize a plurality drawing logical arithmetic process instructions and corresponding drawing object to the drawing object memory unit 2.

The drawing logical arithmetic process determination unit 3 analyzes the drawing logical arithmetic process instruction and determines whether the drawing logical arithmetic process instruction or a plurality of continuous drawing logical arithmetic process instruction has the content which may be processed without any logical arithmetic process or not. This determination can be made when the drawing logical arithmetic process is, for example, the particular drawing logical arithmetic process instruction and under the condition that a plurality of continuous drawing logical arithmetic process instructions are pattern of the particular logical arithmetic process instructions. Moreover, on the occasion of this determination, determination can also be made by making reference to the drawing object which is an object of the logical arithmetic, process instructed by the drawing logical arithmetic process instruction.

The drawing object conversion unit 4 converts one or a plurality of logical arithmetic process instructions which are determined to have content which may be processed without the logical arithmetic process in the drawing logical arithmetic process instruction determination unit 3 and drawing object corresponding to such logical arithmetic process instruction to those which does not require any drawing logical arithmetic process.

The background image data storing unit 5 stores the background image data used in the drawing logical arithmetic process unit 6 and also stores the image data as a result of calculation in the drawing logical arithmetic process unit 6.

The drawing logical arithmetic process unit 6 executes the logical arithmetic process between the drawing object and background image data stored in the background data storing unit 5 depending on the drawing logical arithmetic process instruction, in regard to the drawing logical arithmetic process instruction other than that determined to have the instruction content to be processed without any logical arithmetic process in the drawing object conversion unit 4, and then stores the result to the background image data storing unit 5.

Out line of operation in the preferred embodiment of the present invention will then be explained. When the drawing instruction including the drawing logical arithmetic process instruction is input to the drawing instruction conversion unit 1 is input, the drawing instruction conversion unit 1 converts the input drawing instruction to the drawing object and drawing logical arithmetic process instruction and then stores these to the drawing object memory unit 2. The drawing logical arithmetic process instruction determination unit 3 determines whether one drawing logical arithmetic process instruction or a plurality of continuous drawing logical arithmetic process instructions stored in the drawing object memory unit 2 have the instruction content to be drawn without any drawing logical arithmetic process or not. When the instruction content is determined, as a result, to be processed without any drawing logical arithmetic process, the drawing object conversion unit 4 converts the determined drawing logical arithmetic process instruction and drawing object to those which do not require the drawing logical arithmetic process and continues the subsequent processes by the other processing units.

On the other hand, when the drawing logical arithmetic process instruction determination unit 3 determines that the instruction content requires the drawing logical arithmetic process, the drawing logical arithmetic process unit 6 reads the background image data from the background image data storing unit 5 and performs the drawing logical arithmetic process of the background image data and drawing object obtained. The image data obtained by this logical arithmetic process is written back again to the background image data storing unit 5.

Figure 2:
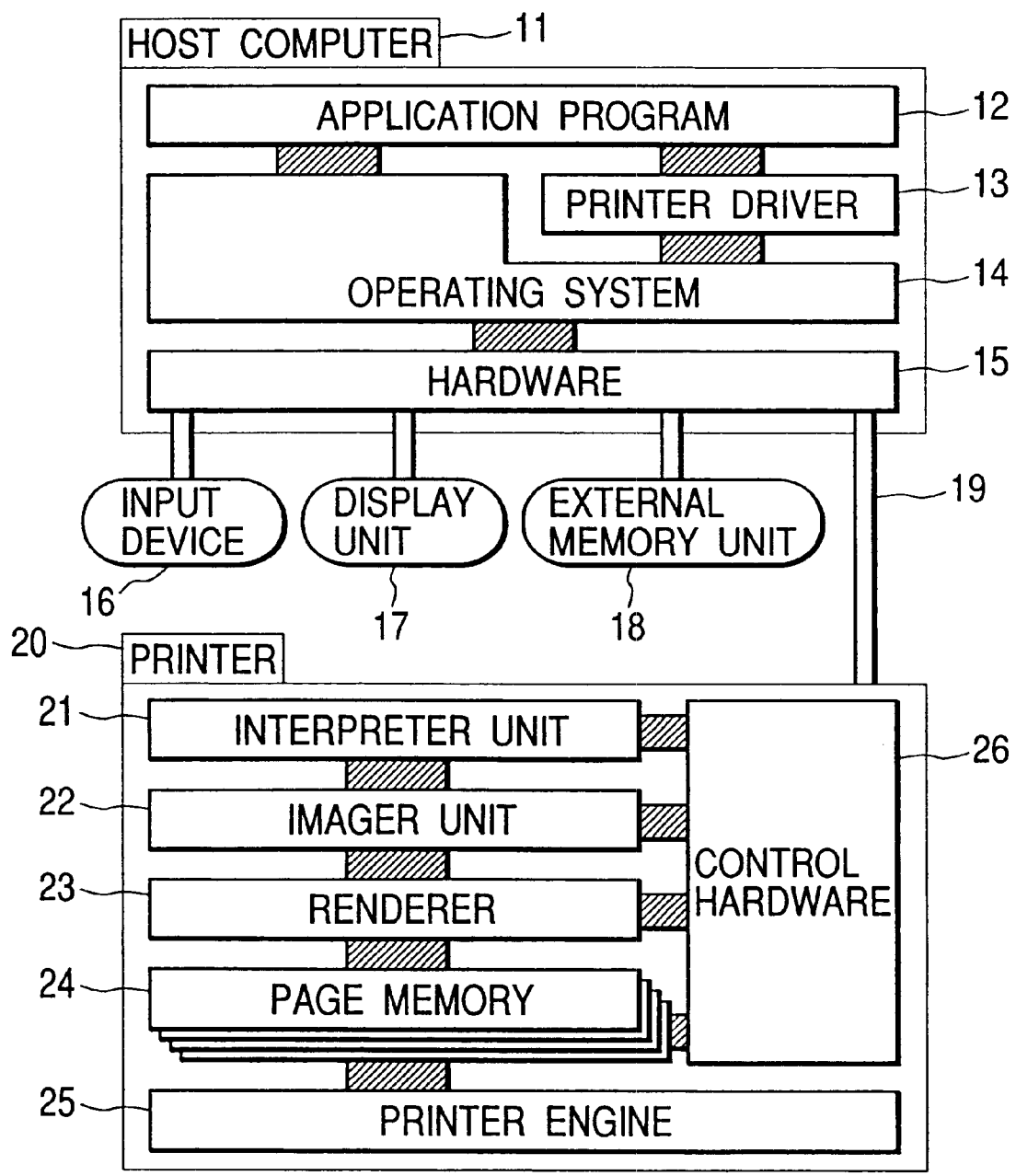
FIG. 2 is a block diagram illustrating an example of an image forming system to realize an embodiment of the present invention.

FIG. 2 is a block diagram illustrating an example of the image forming system to realize a preferred embodiment of the present invention. In the figure, reference numeral 11 designates a host computer; 12, an application program; 13, a printer driver; 14, an operating system; 15, a hardware; 16, an input device; 17, a display device; 18, an external memory unit; 19, a sending path; 20 a printer; 21, an interpreter unit; 22, an imager unit; 23: render unit; 24; a page memory; 25, a printer engine; 26: a control hardware. In this image forming system, an image formed or obtained by the host computer 11 is formed by the printer 20 on a medium to be recorded.

The host computer 11 comprises a hardware 15 such as CPU and memory, etc. and is connected to an input device 16 such as keyboard and mouse as the external device, display device 17 such as CRT, etc. and external memory unit 18 such as hard disk and CD-ROM. Moreover, the host computer 11 is connected A to the printer 20 with the sending path 19 via the interface. These hardware 15, various devices and various software are controlled and is placed under the management of the operating system 14. Under the control and management of this operating system 14, the application program 12 operates. The application program 12 can issues an instruction for printing of characters and images. Here, it is assumed that content to be printed is output as the drawing information described by the page description language.

The printer driver 13 is a program provided in association with a printer 20 and functions when it is loaded to the host computer 11. In general, the printer driver 13 is used to make the host computer 11 to correspond to various data formats assumed to be used in the particular printer 20. Upon reception of the drawing information from the application program 12, the printer driver 13 executes various processing steps before it sends the information to the printer 20. For example, the drawing information received from the application program 12 can be sent through conversion to the line of the command and drawing object which can be interpreted by the printer 20. Otherwise, the drawing information may be sent to the printer 20 in direct in the same data format.

The printer 20 receives drawing information or train of command and drawing data transmitted from the host computer 11 via the sending path 19 to form an image on the medium to be recorded. Therefore, the printer comprises the hardware such as control hardware 26, page memory 24, printer engine 25 and software such as interpreter unit 21, imager unit 22 and renderer unit 23 operating on the control hardware 26.

The interpreter unit 21 recognizes the drawing information and a train of command and drawing data received by the printer 20 to interpret a command by forming the command and argument. Depending on content of interpreted command, an imager unit 22 is called for graphics drawing, characters drawing and image process. The imager unit 22 draws an image depending on the instruction of interpreter unit 21. The renderer unit 23 rasterizes the image drawn by the imager unit 22 and then memories the image in the pager memory 24. In this case, when color printing is executed, for example, an image is rasterized to four planes, for example, of CMYK for respective colors and then memorizes the image in the page memory 24. The printer engine 25 actually forms an image on the medium to be recorded depending on the image data stored in the page memory 24. As the printer engine 25, various kinds of recording methods can be introduced, for example, as well as the laser system.

In such image forming system, all processes of the image processing method of the present invention illustrated in FIG. 1 and the processes up to the drawing object conversion unit 4 can be executed by the printer driver 13 introduced to the host computer 11. Namely, with reference to the drawing information output from the application program 12, when one drawing logical arithmetic process instruction or a plurality of continuous drawing logical arithmetic process instructions do not require the drawing logical arithmetic process between the pixels, such drawing logical arithmetic process instruction and drawing object are converted to the command and drawing object which do not perform the drawing logical arithmetic process and are then sent to the printer 20. In this case, the drawing logical arithmetic process unit 6 and background image data storing unit 5 may be provided in any one of the host computer 11 or printer 20. In the case of providing the drawing object memory unit 2, such elements may be realized using the RAM in the hardware 15 of host computer 11, for example, and a part of the memory area of the external memory unit 18. Moreover, it is also applied when the background image data storing unit 5 is provided in the side of the host computer 11.

Otherwise, the image processing apparatus of the present invention illustrated in FIG. 1 is provided to the printer 20, or the image processing method of the present invention illustrated in FIG. 1 can be executed as the process in the printer 20. In this case, it is enough for the printer driver 13 to perform the process similar to that of the related art. As the process in the printer 20 of the drawing information sent from the host computer 11, when one drawing logical arithmetic process instruction or a plurality of continuous drawing logical arithmetic process instruction among the drawing information do not require the drawing logical arithmetic process between the pixels, such drawing logical arithmetic process instruction and drawing object are converted to the command and drawing object which do not require the drawing logical arithmetic process. Thereby, the drawing object can be drawn without using the drawing logical arithmetic process.

In any case, the drawing logical arithmetic process can be reduced by the process of the present invention to realize high speed image forming process. Moreover, since the drawing logical arithmetic process can be avoided, deterioration of image quality due to the drawing logical arithmetic process, for example, unexpected change of color can be prevented.

Operation of an embodiment of the present invention will further be explained with reference to the practical example. In the following embodiment, a desired color image D (hereinafter referred to as destination image) stored in the background image data storing unit 5, bit map image S (hereinafter referred to as source image) as the drawing object to be drawn there and pattern image P defining the completely painted pattern of the drawing object are assumed. Among these images, the source image S is also called as the mask pattern, while the pattern image P as the background pattern.

A user is capable of designating the logical arithmetic process, to the bit map data between images, such as logical product (AND: a), logical sum (OR: o) and exclusive logical sum (XOR: x) using, for example, the graphical user interface (GUI) of the application program 12. Moreover, the target drawing result can also be obtained by combining these logical arithmetic processes. The logical arithmetic process to obtain the desired drawing result can be designated automatically with the application program 12 in place of the user's direct operation.

When a kind of the logical arithmetic process is indicated by the inverse Poland format, DPa, for example, indicates the logical product (a) of the destination image D and pattern image P. The result is written back to the background image data storing unit 5 as the new destination image D.

Moreover, in the first and second embodiments explained below, the image processing method of the present invention having the structure illustrated in FIG. 1 will then be explained with reference to the example built in the printer driver 13. A user arranges, in the application program 12, the desired drawing object such as character, graphics and images, etc. on the display screen using the graphical user interface (GUI) These drawing objects may be duplicated or may be set to semi-transparent condition by designating a degree of transparency through various designation.

In the case of printing these drawing objects, the application program 12 outputs drawing information to the printer driver 13 through the operating system 14. For example, the drawing information is formed of drawing function, color designation code, logical arithmetic process code and clip area designation, etc. Moreover, in more practical, the drawing information indicating character is composed of drawing function indicating character, character code indicating a kind of character, color information indicating color of character and coordinate information indicating drawing position, etc. The drawing information indicating graphics is composed of drawing function indicating a kind of figure, logical arithmetic process code, a kind of pen used for drawing, pattern designation for complete painting, color information and coordinate information indicating drawing position, etc. Moreover, the drawing information indicating an image such as a photograph is composed of bit map information, logical arithmetic process code, format of bit map and coordinate information indicating the drawing position, etc.

The printer driver 13 generates, from the received drawing information, the command and drawing object fitted to the printer 20 as the object. In this case, the image processing method of the present invention is applied for the drawing information including the drawing logical arithmetic process code, and thereby the drawing information including the drawing logical arithmetic process code which does not require the drawing logical arithmetic process is converted to the command and drawing object which do not conduct the drawing logical arithmetic process.

Figure 3:
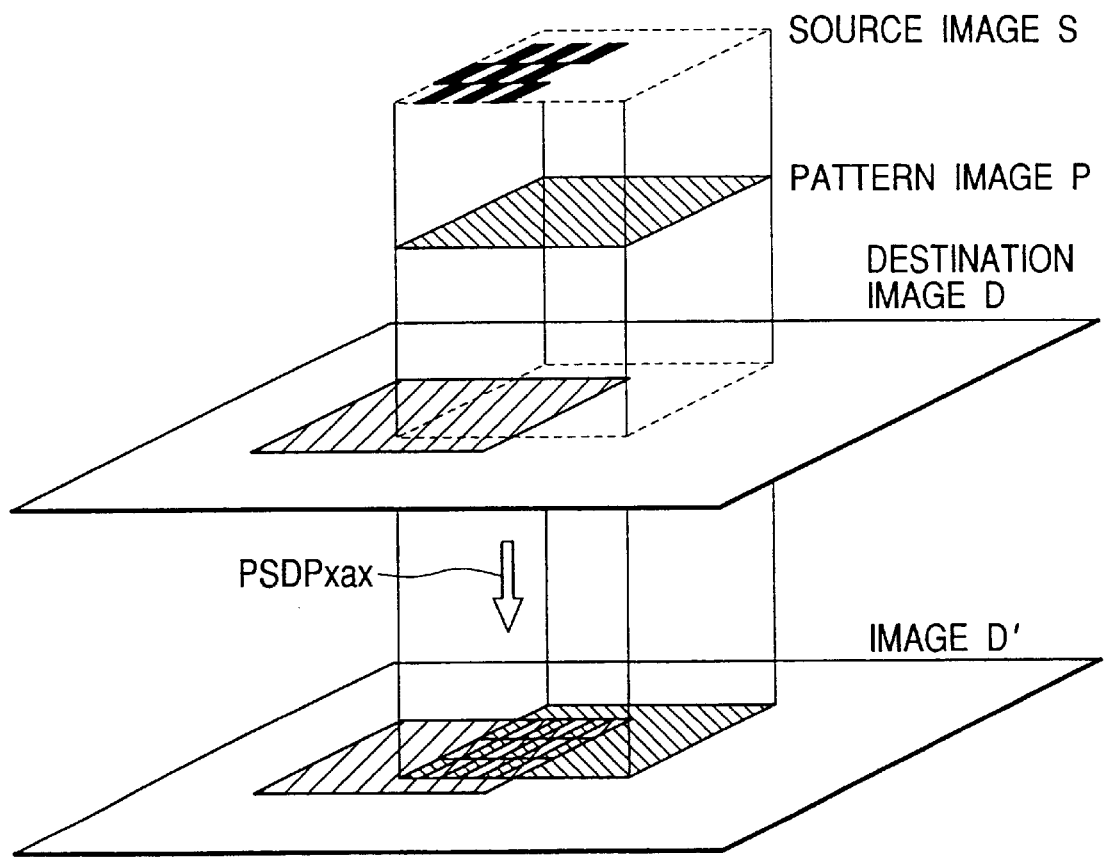
FIG. 3 is a diagram for explaining an example of the drawing logical arithmetic process PSDPxax.

In the first embodiment, the drawing logical arithmetic process PSDPxax is considered in the notation of the inverse Poland format explained above. FIG. 3 is a diagram for explaining an example of the drawing logical arithmetic process PSDPxax. The drawing logical arithmetic process PSDPxax is known as the process that when the designated source image S is the image expressed by the white and black images, the black area transmits through the destination image D, while the white area is intended s the process aiming at effect for completely painting with the pattern image P designated simultaneously. In the example of FIG. 3, the pattern image P having a rectangular image and destination image D having a rectangular image at the position duplicated with the rectangular shape of the pattern image P exist, and the source image S as the binary image having the checked pattern also exists at the area where rectangular images are duplicated. In this case, the destination image D can be obtained by the drawing logical arithmetic process PSDPxax at the area where the source image S is black, the pattern image P is selected at the area where the source image S is white and the image-D' having the checked pattern can be obtained at the duplicated area.

Figure 4:
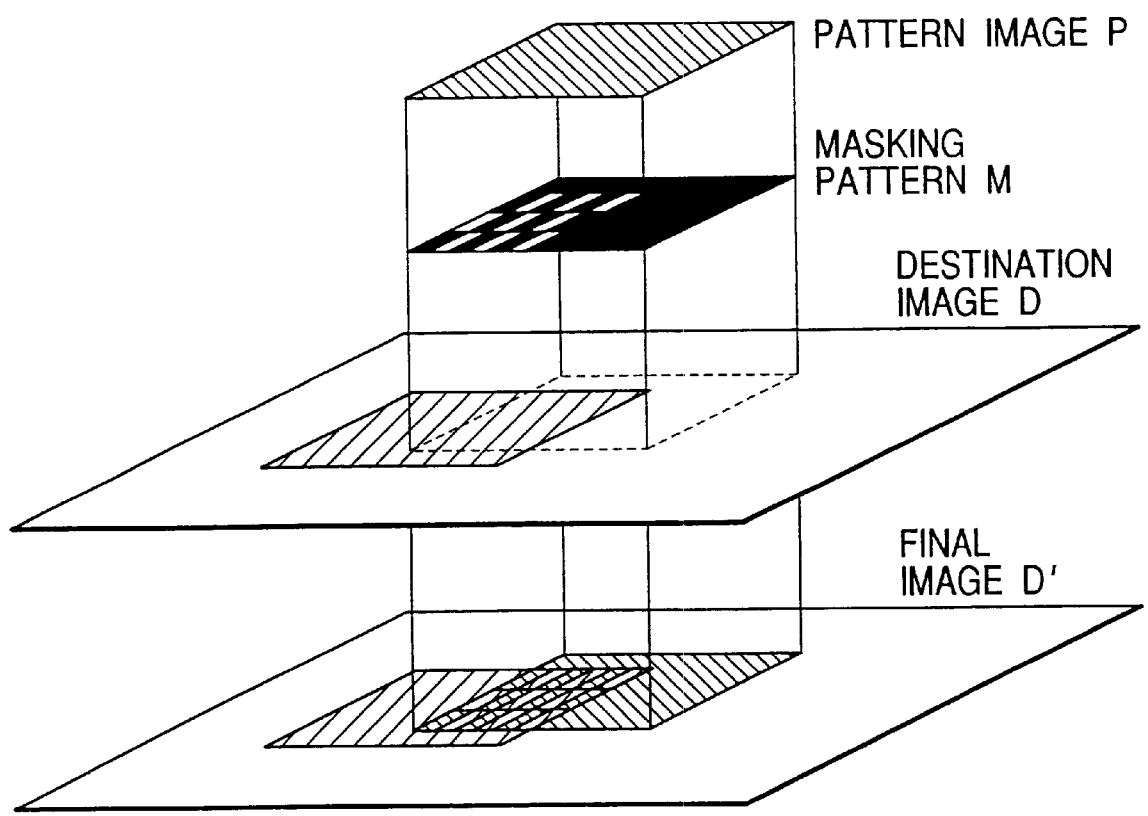
FIG. 4 is a diagram for explaining an example of masking pattern process.

However, in this drawing logical arithmetic process PSDPxax, the source image S may be replaced by the masking pattern process when the source image S is binary image. FIG. 4 is a diagram for explaining an example of the masking pattern process. In the masking pattern process, the pattern image P is adhered to the destination image D depending on the value of masking pattern M and the logical arithmetic process is not performed. The image D' can be obtained as a result of this masking pattern process.

As will be understanding from comparison between the image D' obtained as a result of masking pattern and the destination image D' obtained as a result of drawing logical arithmetic process in FIG. 3, the equal result can be obtained. Namely, when the source image S is a binary image of white and black, the drawing logical arithmetic process instruction instructing the drawing logical arithmetic process PSDPxax has the content to be processed without drawing logical arithmetic process. In addition, this drawing logical arithmetic instruction can be known to be changed for the masking pattern process. In the present invention, when the drawing logical arithmetic process instruction is PSDPxax and the source image S is a binary image of white and black, its logical arithmetic process instruction and source image S are output after these are converted to the instruction for masking pattern process and to the masking pattern M. Thereby, process can be realized without conducting the drawing logical arithmetic process PSDPxax which requires the time. Moreover, since the drawing logical arithmetic process PSDPxax can be avoided, possibility for deterioration of image quality can also be avoided.

Figure 5:
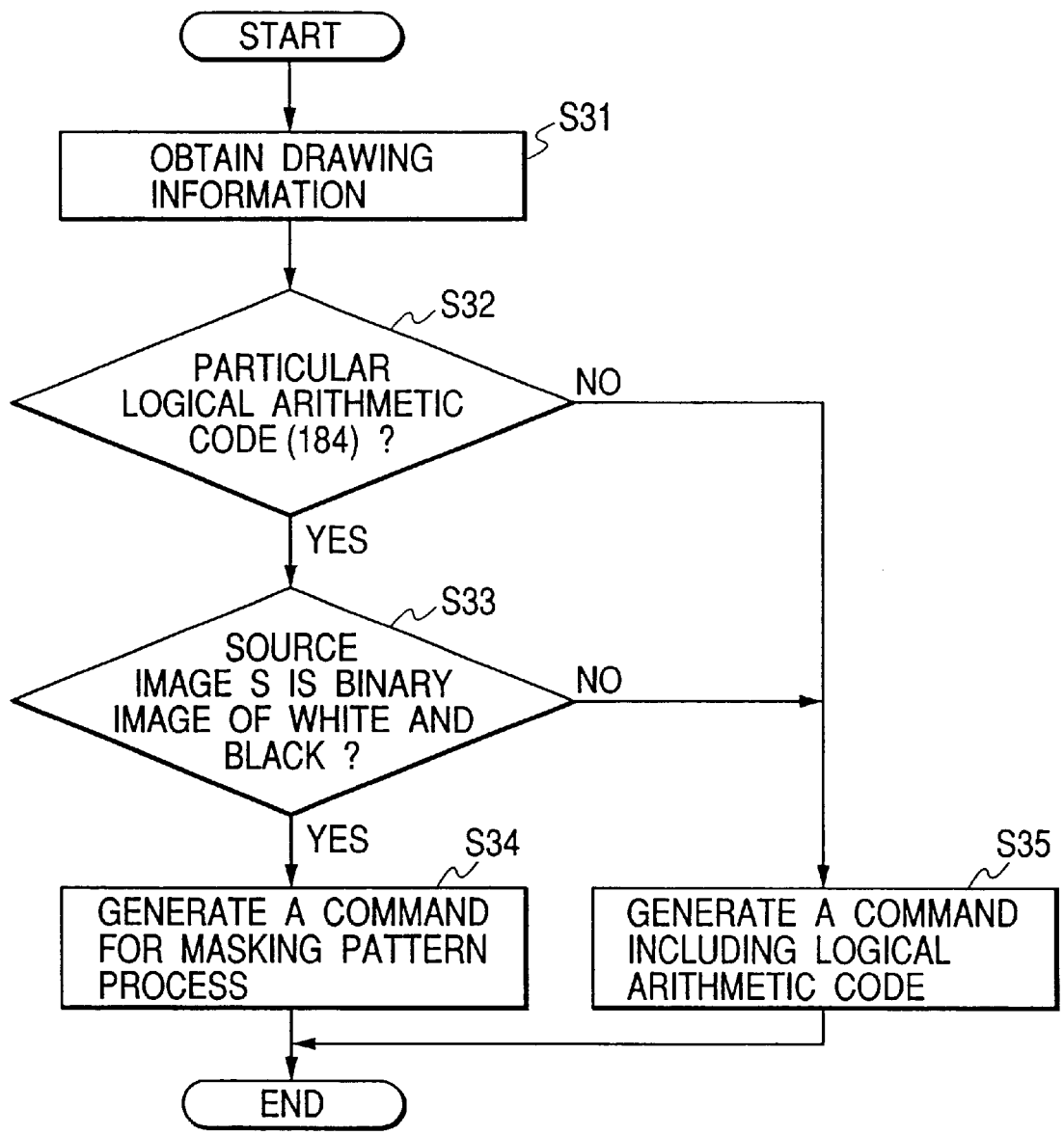
FIG. 5 is a flowchart illustrating an example of the first practical conversion process in an embodiment of the present invention.

FIG. 5 is a flowchart illustrating an example of the first practical conversion process in the preferred embodiment of the present invention. In S31, the drawing information including the drawing logical arithmetic process is obtained and the drawing logical arithmetic code thereof is searched in the step S32. For example, the drawing logical arithmetic process PSDPxax explained above is the drawing logical arithmetic code 184, whether the drawing logical arithmetic code is 184 or not is searched. When the drawing logical arithmetic code is 184, the source image S which has been input together with the drawing information is analyzed in the step S33 and whether the source image S is the binary image of black and white or not is determined. When the source image S is determined as the binary image of white and black as a result of analysis, the drawing object and drawing logical arithmetic process instruction are converted to the instruction and drawing object which do not require the drawing logical arithmetic process. Namely, in the step S34, the masking pattern M is generated from the source image S and the instruction to conduct the masking pattern process using the pattern image P is also generated and it is then sent to the printer 20.

Meanwhile, when the drawing logical arithmetic code in the drawing information is not 184, and when the drawing logical arithmetic code is 184 but the source image S is not the binary image of white and black, the process similar to that of related art is conducted in the step S35 and such code is sent to the printer 20, for example, as the logical arithmetic code designation command, pattern image designation command, source image designation command. In the side of printer 20 which has received such commands, the raster data is generated by executing the logical arithmetic process between receives source image, pattern image and destination image data stored in the page memory depending on the command instruction.

Figure 6:
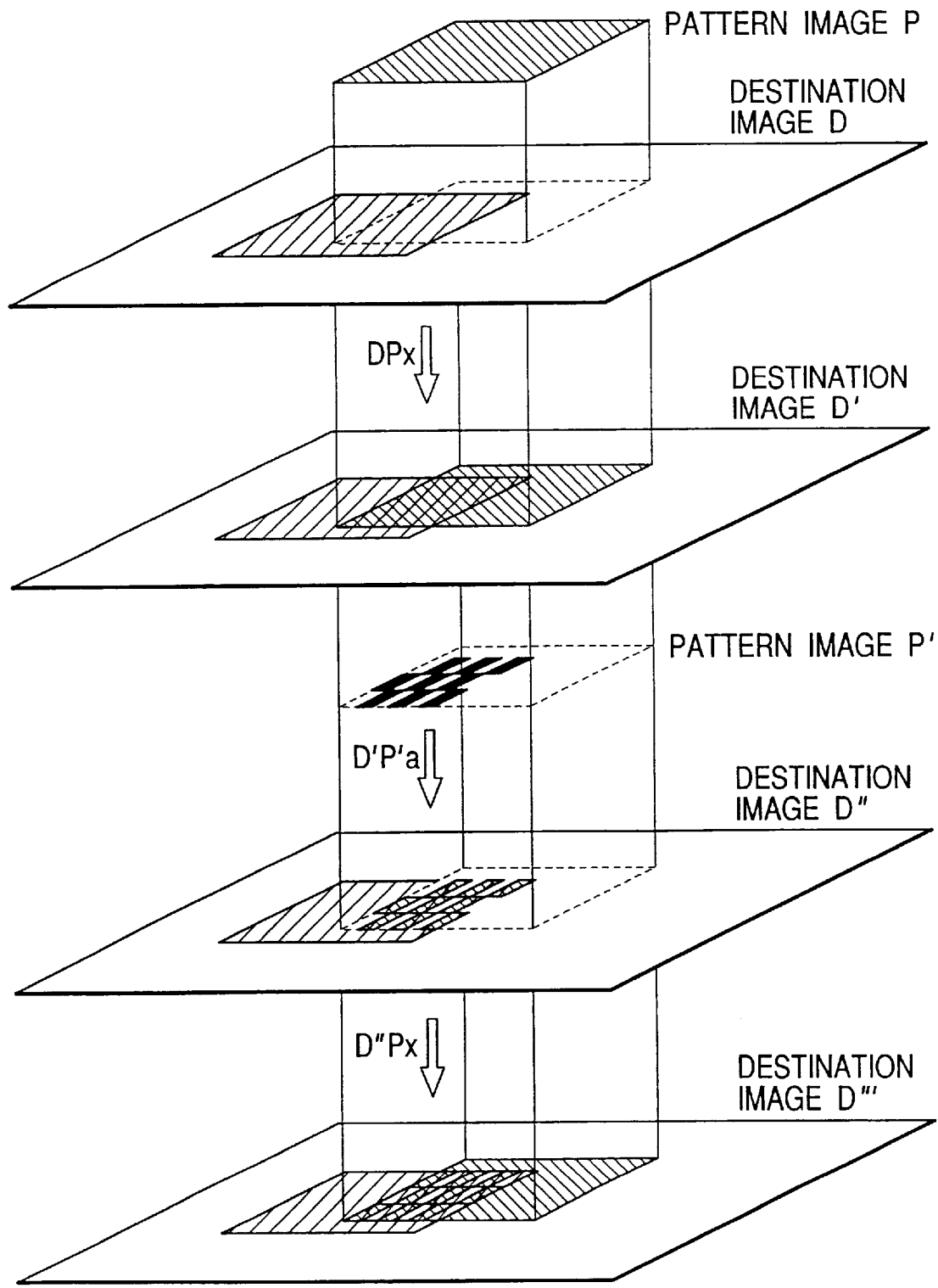
FIG. 6 is a diagram for explaining an example of combination of a plurality of drawing logical arithmetic process.

Next, as the second embodiment, another drawing logical arithmetic process will be considered. Here, it is assumed that a plurality pieces of drawing information are combined for a certain drawing purpose. FIG. 6 is a diagram for explaining an example of combination of a plurality of drawing logical arithmetic processes. In this example, the exclusive logical sum (X) of the first pattern image P and destination image D is designated to generate a new destination image D'. Namely, the drawing logical arithmetic process expressed as DPx by the inverse Poland format notation explained above is executed.

Next, the logical product (a) of the second pattern image P' of white and black and the destination image D' generated by the first drawing information is designated by the second drawing information to further generate a new destination image D". This is the drawing logical arithmetic process expressed as DPa. In FIG. 6, D'P' a is used to apparently indicate the logical arithmetic process using the second pattern image P' and destination image D'.

Finally, the exclusive logical sum (x) of the first pattern image P same as that designated by the first drawing information and the destination image D" generated by the second drawing information is designated by the third drawing information to generate the target destination image D'''. This drawing logical arithmetic process is expressed as DPx as in the case of the first drawing information. In FIG. 6, D" Pa is used to apparently indicate the logical arithmetic process using the first pattern image P and destination image D".

With the drawing logical arithmetic process conducted depending on the drawing logical arithmetic process instruction included in the three pieces of drawing information, an image in which the destination image passes through the black area and the white area is completely painted by the pattern image (P) designated by the first and third drawing information can be obtained for the image which is expressed by white and black image as the second pattern image P'.

The processing result of such drawing logical arithmetic processes of three stages is just identical to the result of the masking pattern process illustrated in FIG. 4. Namely, it is the process aiming at the effect that the destination image D is passing through the black area and the white area is completely painted by the first pattern image P designated by the first and third drawing information, using the binary image pattern P' of white and black of the second drawing information as the masking pattern M.

As explained above, it can be understood that the process may be replaced with the masking pattern process when drawing logical arithmetic process instructions in the continuous three pieces of drawing information are arranged in the sequence of DPx, DPa, DPx, the first pattern image P of the first drawing information and third drawing information is identical with each other and the second pattern image P' is the binary image of white and black. In the present invention, whether continuous three pieces of drawing information are matched with the conditions explained above or not is determined. When information is matched with such condition, the process is converted to the masking pattern process to reduce the number of steps of the drawing logical arithmetic process.

Figure 7:
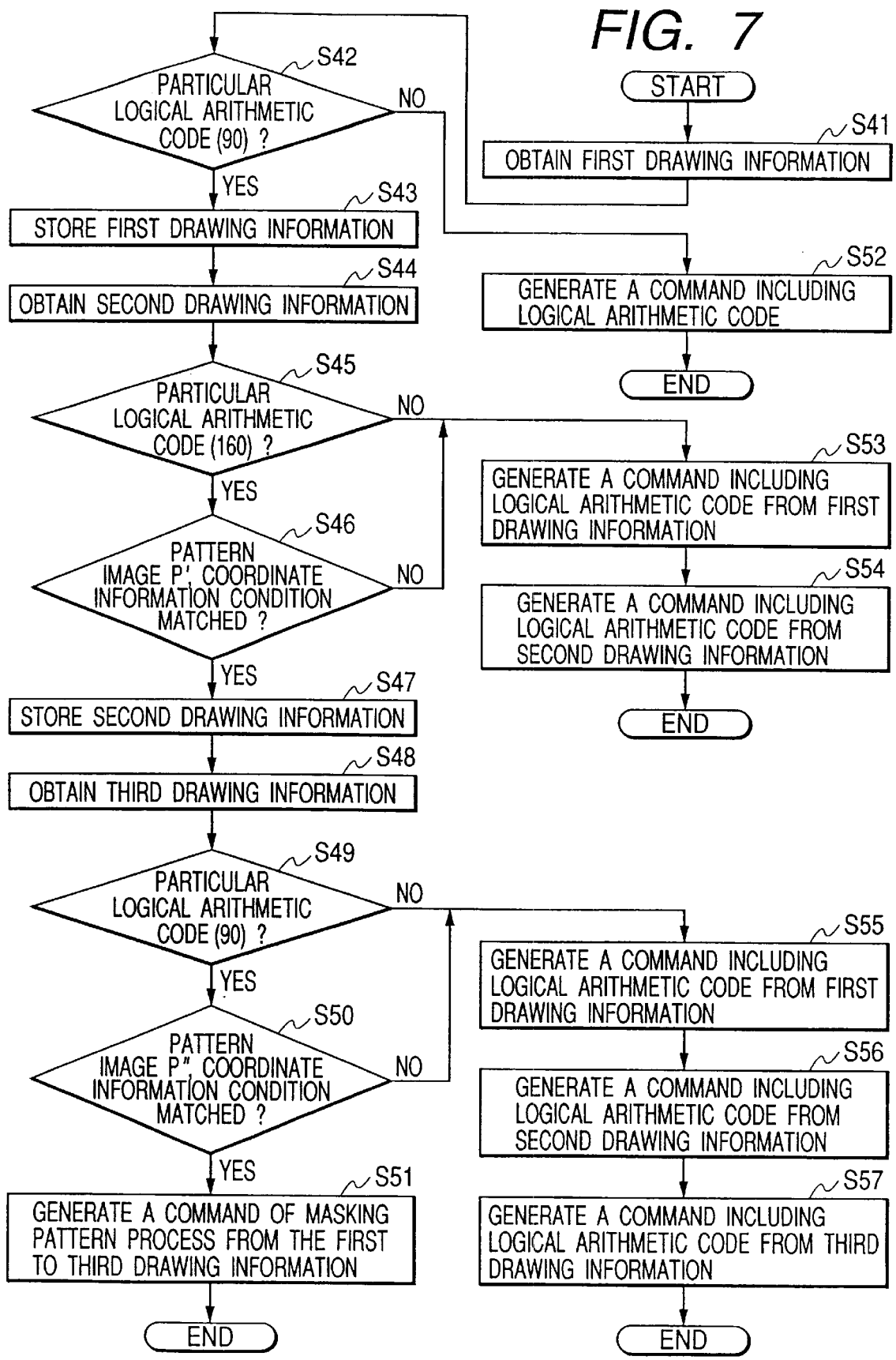
FIG. 7 is a flowchart illustrating an example of the second practical conversion process in an embodiment of the present,invention.

FIG. 7 is a flowchart illustrating an example of the second practical conversion process in the preferred embodiment of the present invention. Here, the logical arithmetic code instructing the drawing logical arithmetic process DPx is assumed as 90, while the logical arithmetic code instructing the drawing logical arithmetic process DPa is assumed as 160 for the convenience of explanation. In the step S41, the first drawing information is obtained and whether the logical arithmetic code in the first drawing information is 90 or not is determined. When the logical arithmetic code is determined as 90, the pattern image P input together with the first drawing information and the other drawing information are stored, for example, in the drawing object memory unit 2, etc. in the step S43. Thereby, the process for the drawing information obtained in the step S41 is completed. In this timing, any command for the first drawing information is never output.

Meanwhile, when the logical arithmetic code in the first drawing information obtained in the step S41 is not 90, the command for the first drawing information obtained and the drawing object are output in the step S52 as in the case of related art to complete the process of the first drawing information.

Next, in the step S44, the second drawing information is obtained and whether the logical arithmetic code in the second drawing information is 160 or not is determined in the step S45. When the logical arithmetic code is 160, the second pattern image P' input together with the second drawing information and the coordinate information are analyzed in the step S46. In this analysis, whether the second pattern image P' is the binary image of white and black or not is determined and moreover the object coordinate information of the drawing information obtained previously is determined. When the second pattern image P' is the determined as the binary image of white and black and the object coordinate is determined as identical, the second pattern image P' and the other drawing information are stored in the drawing object memory unit 2, etc. in the step S47. In this case, the command for the second drawing information is not output and the process for the second drawing information is completed here. With the processes up to this step, a couple of pieces of drawing information are stored in the drawing object memory unit 2.

On the other hand, when the logical arithmetic code in the second drawing information obtained in the step S44 is determined not to be 160 and the second pattern image P' is determined not to be the binary image of white and black in the step S46, or when the object coordinate is determined to be different, the command and drawing object are generated from the first drawing information stored in the drawing object memory unit 2 in the step S53 and these are then sent to the printer 20. Next, in the step S54, the command and drawing object are generated on the basis of the second drawing information and are then sent to the printer 20. In this case, the command is processed as the ordinary drawing command by the printer 20.

Next, in the step S48, the third drawing information is obtained and whether logical arithmetic code in the third drawing information is 90 or not is determined in the step S49. When the logical arithmetic code is 90, the third pattern image P" input together with the third drawing information and the coordinate information are analyzed in the step S50. In this analysis, whether the third pattern image P" is the identical to the first pattern image P corresponding to the first drawing information or not is determined and moreover the coordinate thereof is matched or not with the coordinate of the first drawing information held in the object coordinate is also determined. When the third pattern image P" is determined to be identical to the first pattern image P and the object coordinate is determined to be matched, a series of first to third pieces of drawing information are determined to be converted to the masking pattern process. In the step S51, the second pattern image P' corresponding to the second drawing information is converted to the masking pattern M and a command as the instruction to perform the masking pattern process in which the first pattern image P or third pattern image P" corresponding to the first or third drawing information are used as the designated pattern image is generated and is then sent to the printer 20. In this case, also, the drawing process in the printer 20 is identical to the process where pattern image is adhered for the destination image depending on the masking pattern and therefore the logical arithmetic process between image data can no longer be required.

On the other hand, when the logical arithmetic code of the third drawing information obtained in the step S48 is not 90 and when the third pattern image P" is not matched with the first pattern image P in the step S50 or when the object coordinate information is different, the command and drawing object are respectively output for the first to third pieces of drawing information. Namely, in the step S55, the command and drawing object are generated from the first drawing information stored in the drawing object memory unit 2 and are then sent to the printer 20. Next, in the step S56, the command and drawing object are generated, in the step S56, based on the second drawing information stored in the drawing object memory unit 2 and are then sent to the printer 20. Finally, in the step S57, the command and drawing object are generated based on the third drawing information and are then sent to the printer 20. In this case, each command processed as the ordinary drawing command by the printer 20.

In the first and second practical examples explained above, the drawing logical arithmetic process PSDPxax or continuous three drawing logical arithmetic processes DPx, DPa, DPx are detected. These are only examples and one or a plurality of drawing logical arithmetic instructions which may be processed without the other logical arithmetic processes may be converted to the instruction and drawing object not including the logical arithmetic processes.

Moreover, the processes regarding the first and second practical embodiments explained above may solely be comprised or through combination thereof. It is of course possible that such process may be determined together with the one or a plurality of continuous drawing logical arithmetic processes without execution of the other logical arithmetic process and may also be executed. For example, when a certain drawing information is obtained, it is possible to form the structure to execute the process depending on the logical arithmetic code in such a manner that it is determined that the logical arithmetic code in the drawing information is 184 or 90 or the logical arithmetic code of the other conversion object and when the logical arithmetic code is 90, the process illustrated in FIG. 7 is executed.

In the first and second practical example explained above, the drawing information from the application program 12 via the operating system 14 is analyzed within the printer driver 13 for the drawing information having the particular logical arithmetic code to generate a command which does not require logical arithmetic process between the image data. However, such analysis and command conversion process is never limited to the process within the printer driver 13. Namely, process as the ordinary drawing command is performed within the printer driver 13 and as a result, the command designating the particular logical arithmetic process is also sent to the printer 20. In the side of printer 20, such analysis is executed, for example, in the interpreter unit 21. Thereby, as a result, the process may be converted to the internal process which does not require the logical arithmetic process. In this case, the drawing instruction illustrated in FIG. 1 may be defined as the command which the printer 20 receives or the internal code which is generated by the interpreter unit 21.

The third practical example will then be explained hereunder. In the third practical example, the image processing method of the present invention of the structure explained above is comprised, within the printer 20, to the interpreter unit 21. A user arranges as desired, in the application program 12, the drawing objects, on the display area, such as characters, graphics and images, etc. using, for example, a graphical user interface (GUI). These drawing objects are subjected to various designations such as designation for overlapping and transparent condition.

Figure 8A:
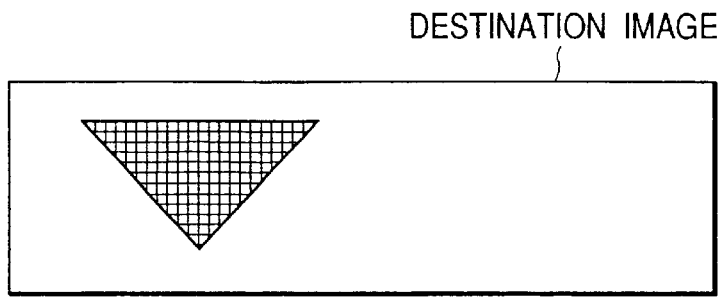
FIGS. 8A, 8B, 8C and 8D are diagrams for explaining an example of a gradation image generating method using the logical arithmetic process.
Figure 8B:
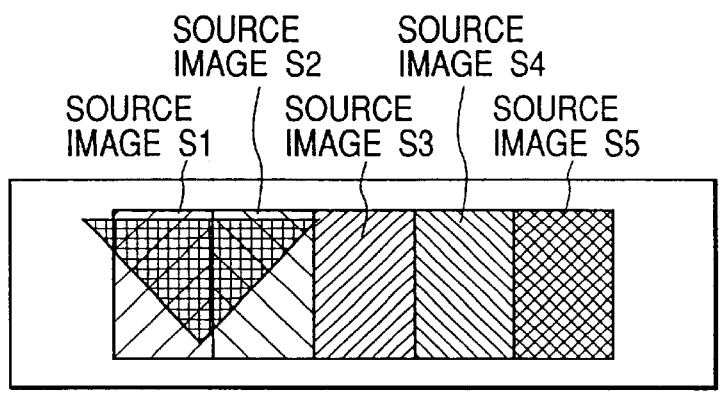

Among these drawing methods, a gradation image can particularly be generated using a plurality of graphics data. FIG. 8 is a diagram for explaining an example of a gradation image using the logical arithmetic process. FIG. 8A illustrates the destination image D before the drawing of gradation. In this example, a triangular figure is drawn. Next, in the FIG. 8B, the images up to the source image S5 from the source image S1 are drawn by the arithmetic process of SDx, namely by the exclusive logical sum of the destination image D and source image S. Next, in FIG. 8C, drawing is finally made in such a shape as leaving the gradation part by the color of value 0 (black in the RGB color space). In this example, an elliptical shape indicating the source image S6 is drawn. Finally, drawing similar to that of FIG. 8B is conducted in FIG. 8D. Namely, using the source image Si to source image S5, drawing is conducted by the arithmetic process of SDx.

Here, the exclusive logical sum has the property to store the pixels before execution of process when the drawing is performed twice with the same color in the same position. Moreover, exclusive logical sum for the image having a value 0 becomes equal to the result similar to that in the case where only the overwriting is conducted. FIG. 9 is a diagram illustrating the result of arithmetic process of exclusive logical sum. FIG. 9A illustrates the result of two times of exclusive logical sum with the same source image S for the destination image D. Namely, the exclusive logical sum of the destination image D and source image is DSx and arithmetic process of exclusive logical sum with the source image S to the result explained above is expressed as SDSxx. In FIG. 9A, combination of every value to be considered of the destination image D and source image S is illustrated. As will be understood from FIG. 9A, result of the arithmetic process of SDSxx is matched with the destination image D as the original image.

Moreover, FIG. 9B illustrates the result of exclusive logical sum o the destination image D having value 0 and the source image S. The arithmetic process is expressed as DSx. As illustrated in FIG. 9B, result of arithmetic process of DSx is matched with the source image S.

Figure 8C:
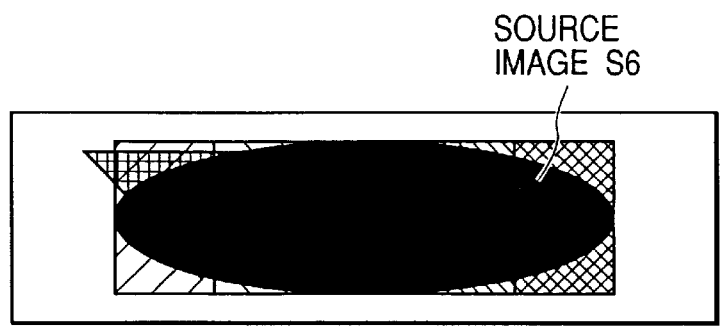
Figure 8D:
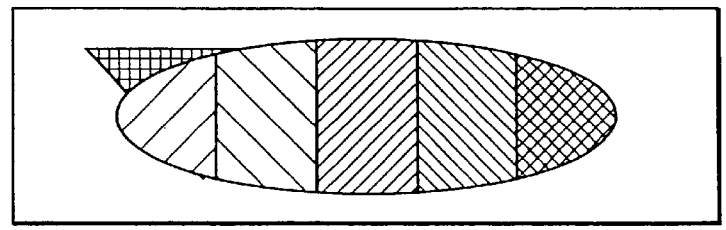

As a result, since the exclusive logical sum of the images from the source image S1 to the source image S5 is obtained for the image illustrated in FIG. 8C, the original destination image D explained in FIG. 9A appears in the part other than the elliptical shape drawn with the color having the value 0. Moreover, in the elliptical shape area, the images up to the source image S5 from the source image S1 appear as explained in FIG. 9B. Namely, in FIG. 8D, output is made as a result that gradation is clipped only to the elliptical shape area to which drawing is made in the color having the value 0 with the process of FIG. 8C. According to this drawing method, gradation may be drawn freely in any shape.

The printer driver 13 receives the drawing instruction indicating a series of processes explained above from the application program 12 and then sends the instruction to the interpreter unit 21 within the printer 20 via the communication path 19. In this case, such drawing instruction is sent by the drawing instruction group called PDL (page description language). FIG. 10 is a diagram for explaining an example of the page description language, while FIG. 11 is a diagram for explaining an example of the logical arithmetic code used in the page description language. Here, set attribute instruction, drawrect instruction, drawellipse instruction, startclip instruction and endclip instruction are considered.

The setattribute instruction sets an attribute of the figure drawn subsequently. The number of parameters of set attribute instruction is 4 and the parameters up to the third one from the first parameter indicate sequentially the color values in the RGB color space in the sequence of R, G, B. The fourth parameter indicates the logical arithmetic code. Correspondence between the logical arithmetic process and logical arithmetic code is as illustrated in FIG. 11 and total of 16 kinds of correspondence form 1 to 16 is defined.

Moreover, the drawrect instruction draws the rectangular shape figure through complete painting depending on the current attribute. The drawrect instruction has four parameters, indicating x and y coordinates of two diagonal points. Moreover, drawellipse instruction draws the elliptical shape figure through complete painting depending on the current attribute. The drawellipse instruction has four parameters, indicating x and y coordinates of two diagonal points of circumscribed rectangular surrounding the elliptical shape.

Moreover, the startclip instruction, endclip instruction are used to generate the clip area and does not require any parameters. The figure drawing instruction issued within the statement surrounded by these two instructions is converted to the clip area. Here, clip process is conducted to clip a certain figure in the desired shape. For example, this clip process may be realized by the method disclosed in the Japanese Published Unexamined Patent Application No. HEI 6-274643.

FIG. 12 is a diagram for explaining an example of the drawing instruction group to draw the third practical example. FIG. 12A illustrates drawing of a gradation image illustrated in FIG. 8, using the PDL defined as explained with reference to FIG. 10 and FIG. 11. The set attribute instruction and drawrect instruction up to the $10^{th}$ line correspond to the drawing in FIG. 8B. Namely, the images from the source image S1 to source image S5 are drawn in every two instructions. The instruction described in the next $11_{th}$ to $12_{th}$ lines is used to draw the elliptical shape with the color in the RGB space defined as R, G, B=0, 0, 0. This drawing corresponds to the drawing of elliptical shape illustrated in FIG. 8C. Moreover, the instruction described up to the final line from the $13_{th}$ line is used to draw the images up to the source image S5 from the source image S1, corresponding to the drawing in FIG. 8D.

With these instruction groups, the figure shape (elliptical shape in this example) drawn in FIG. 8C becomes the gradation figure to be left finally. Namely, this figure becomes identical to the figure in which the gradation figure is clipped in the figure shape drawn in FIG. 8C. PDL illustrated in FIG. 12A can be updated as illustrated in FIG. 12B using the startclip instruction and endclip instruction by utilizing the process explained above. In the description illustrated in FIG. 12B, the elliptical drawing area in FIG. 8C is set as the clip area in the first to third lines. Thereafter, in the fourth to $13_{th}$ lines, a series of gradation figure is drawn. Description from the fourth to $13_{th}$ lines is same as that from the $1_{st}$ to $10_{th}$ lines or from the $13_{th}$ to $22_{nd}$ lines in FIG. 12A, but the logical arithmetic code is changed to 13 (over-writing by source image).

As explained above, in FIG. 12A, drawing is made as in the case of FIG. 8 using the exclusive logical sum as the logical arithmetic process, but it is proved all drawings may be expressed by the ordinary over-writing process using the clip instruction in FIG. 12B. In the present invention, when instructions to draw the same source image with the exclusive logical sum are arranged sandwiching the drawing of the figure having the value 0, such instructions may be converted to the train of the drawing instructions not conducting the logical arithmetic process by converting such instructions to the train of drawing instructions using the clip instruction. Therefore, the drawing process may be realized at a high speed. Moreover, deterioration of image quality can also be avoided by not executing the logical arithmetic process.

Figure 13:
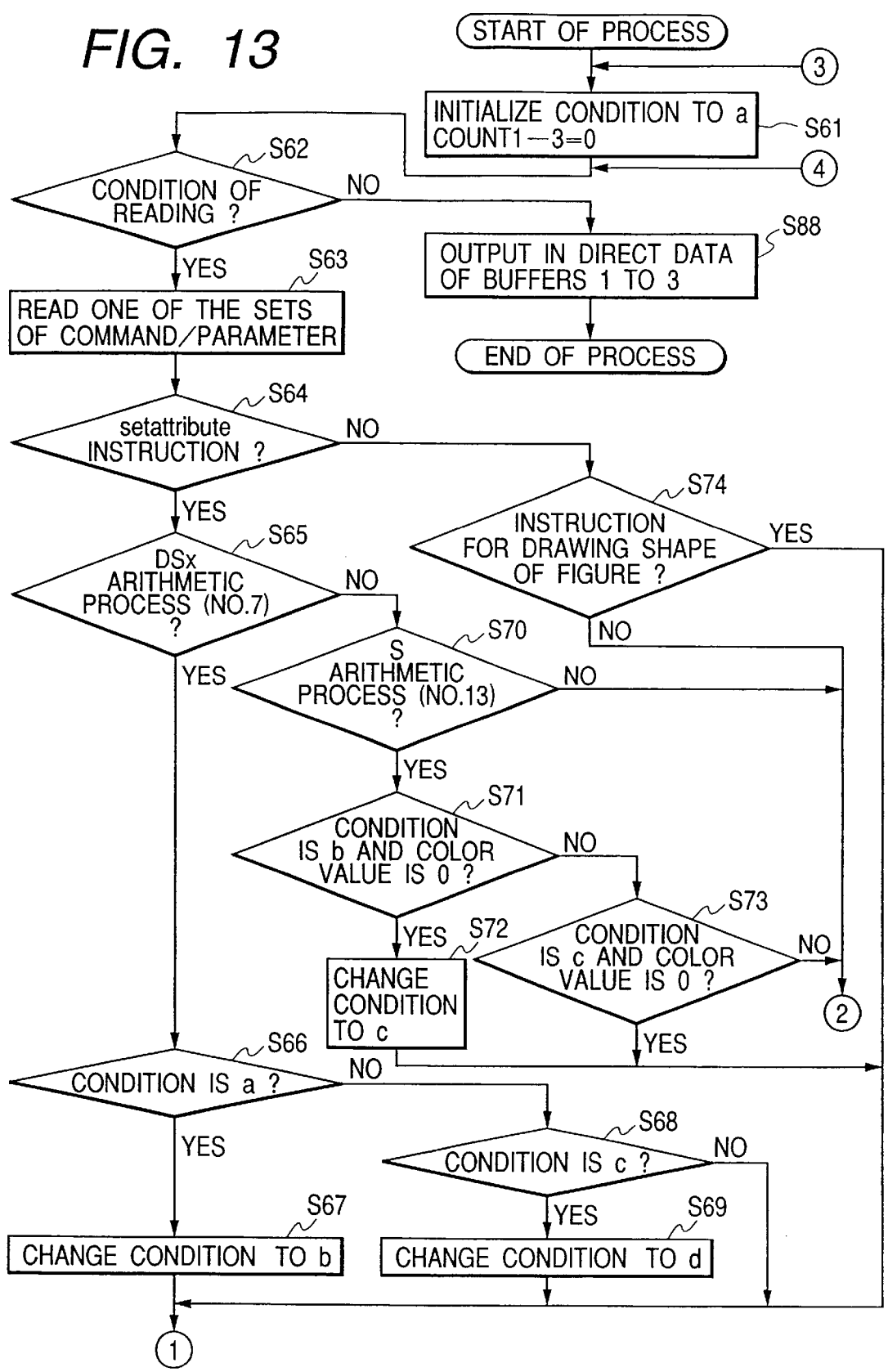
FIG. 13 is a flowchart illustrating an example of the third practical conversion process in an embodiment of the present invention.
Figure 14:
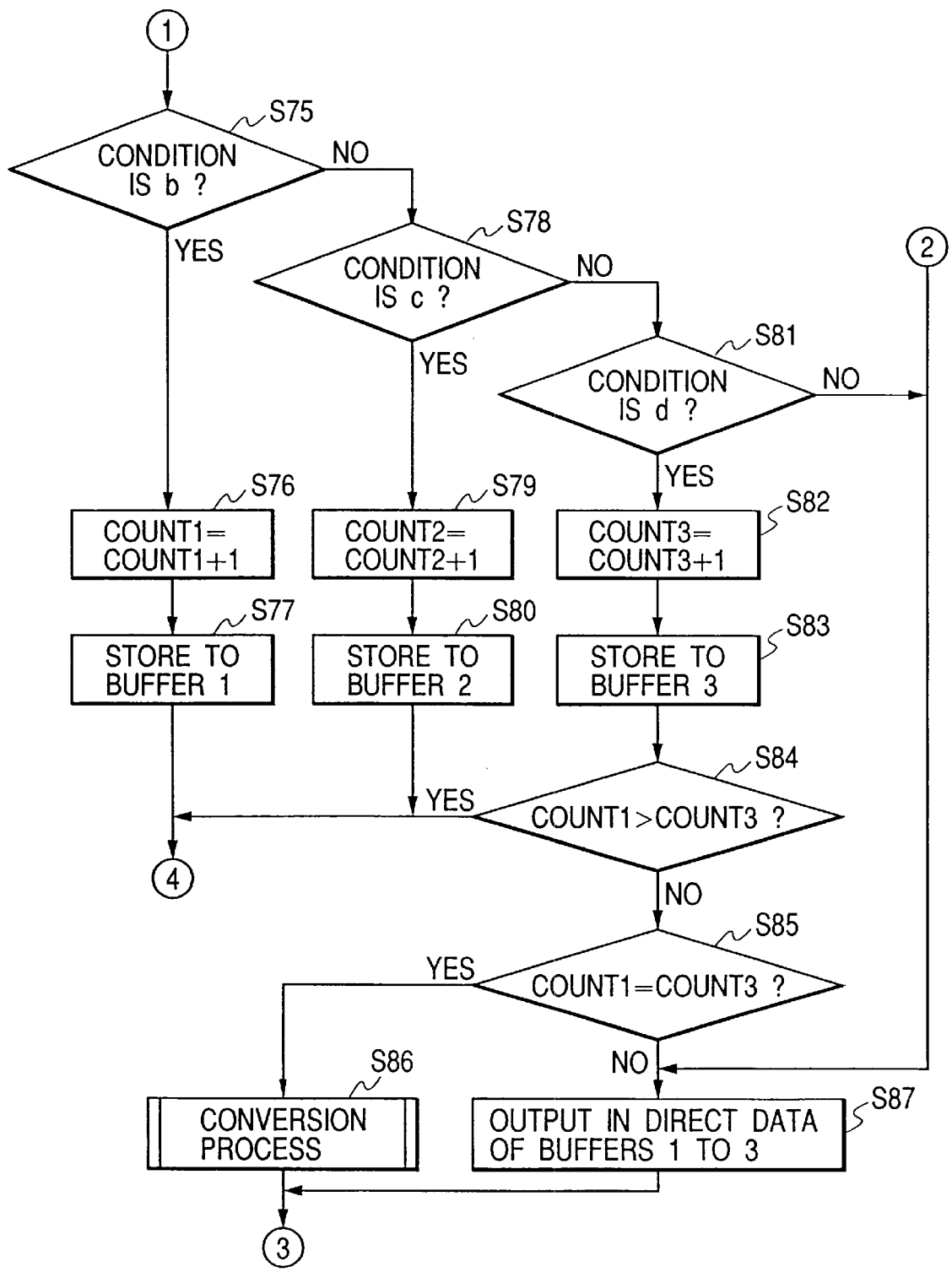
FIG. 14 is a flowchart (continuation) illustrating an example of the third practical conversion process in an embodiment of the present invention.
Figure 15:
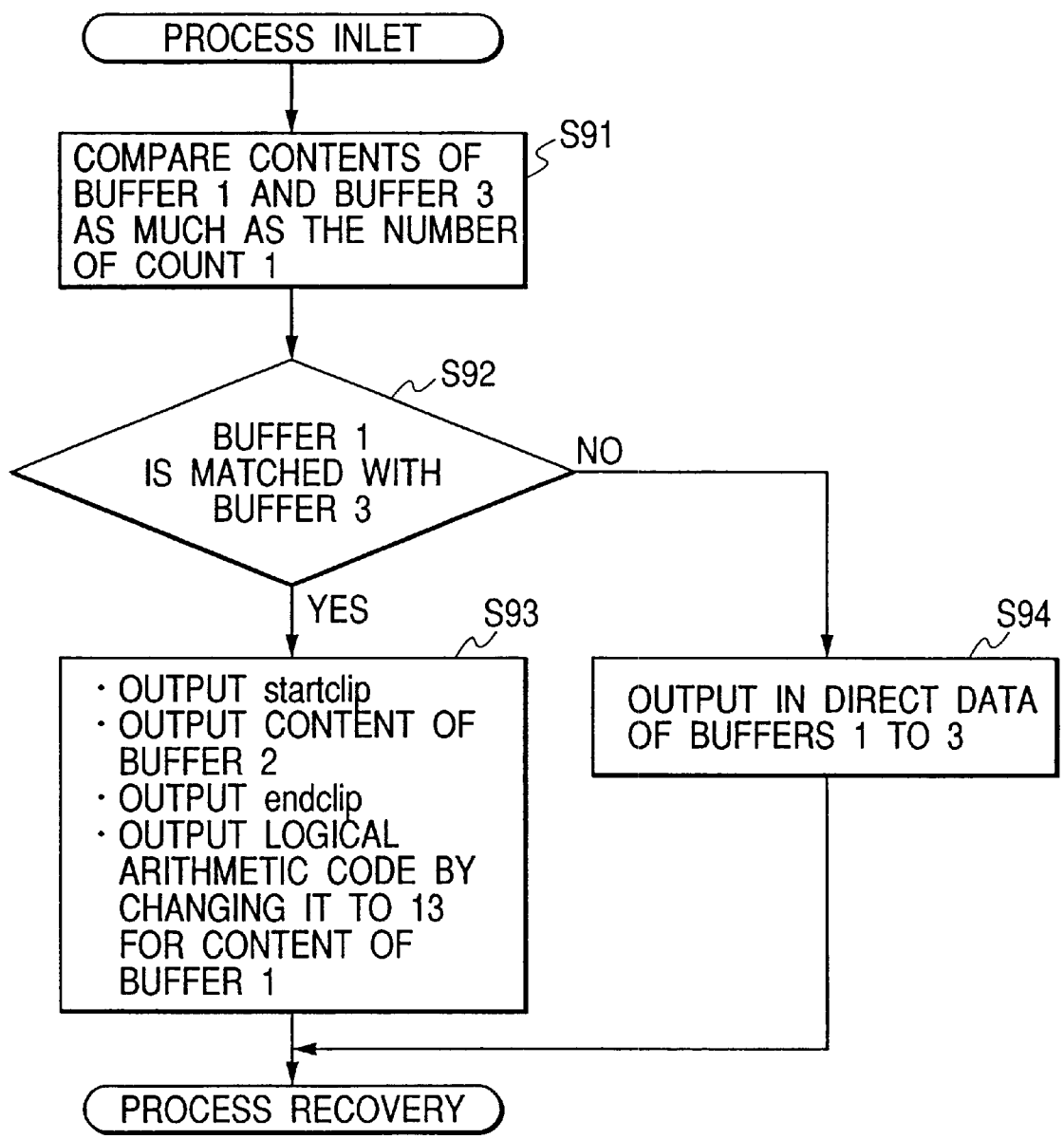
FIG. 15 is a flowchart (sub-routine) illustrating an example of the third practical conversion process in an embodiment of the present invention.

FIG. 13 to FIG. 15 are flowcharts illustrating an example of the third practical conversion process in the preferred embodiment of the present invention. The processes illustrated in FIG. 13 and FIG. 14 perform the condition transition from the conditions a to d as the internal condition. The condition a indicates the initial condition. The condition b indicates the condition that the drawing instruction corresponding to the source images from S1 to S5 illustrated in FIG. 8B, for example, is received, namely the condition that a set of instruction and parameter up to the $10_{th}$ line in FIG. 12A is received. Moreover, the number of sets of the instruction and parameter received by the condition b are stored to the COUNT1 variable. The condition c indicates the condition that the drawing instruction to draw the elliptical shape of the color in the value 0 illustrated in FIG. 8C is received, namely the condition that a set of instruction of the $11_{th}$ and $12_{th}$ lines of FIG. 12A and the parameter is received. A set of the instruction received in the condition c and the parameter is memorized in the COUNT2 variable. The condition d indicates the condition that the drawing instruction corresponding to the source image S5 is received from the source image S1 illustrated in FIG. 8D, namely the condition that the instruction of the lines after the $13_{th}$ line of FIG. 12A is received. Moreover, a set of the instruction and parameter received in this condition d is memorized to the COUNT3 variable. In addition, the instruction and parameter corresponding to each variable of these COUNT1 to COUNT3 are assumed respectively to the buffer 1 to buffer 3.

First, in the step S61 immediately after the start of process, the internal condition is initialized to the condition a and each variable of COUNT1 to COUNT3 is initialized to 0. In the next step S62, whether reading of PDL should be continued or not is determined. This determination is necessary to detect that PDL has issued the printing instruction or not and process is interrupted with a certain reason or not. When reading must be continued, a set of command and parameter is read in the step S63.

In the step S64, whether the command and parameter having been read are set attribute instruction or not is determined. When these are set attribute instruction, whether the fourth parameter has the logical arithmetic code 7 or not is determined, namely whether the DXx logical arithmetic process is designated or not is determined in the step S65. When the DSx arithmetic process is designated, whether the condition is a or not is determined in the step S66. When the condition is a, the instruction train of DSx arithmetic process is assumed to be started, the condition is changed to b in the step S67. Moreover, in the step S68, whether condition is c or not is determined. When the condition is c, instruction train of the DSx arithmetic process after drawing the figure with the color of value 0 is assumed to be started and the condition is changed to d in the step S69. When the other condition is detected, process goes to t he step S75 without execution of the change of condition.

When the fourth parameter of the set attribute instruction is not No. 7, the process goes to the step S70 and whether the over-writing is designated under the condition that the fourth parameter is 13, namely the image is the source image S. When the over-writing is designated, whether the condition is b or not and whether value of color is 0 or not are determined in the S71. In this case, it is probable that the figure to be clipped after the train of drawing instructions of the DSx arithmetic process is drawn. Therefore, the condition is changed to c in the step S72 and the process goes to the step S75. Moreover, when the condition is c and value of color is 0 in the step S73, the condition is never changed and the process goes to the step S75 under the assumption that drawing of figure to be clipped is still continued. In other conditions, or when a value of color is a certain value other than 0, conversion to the clip instruction cannot be made and therefore the current PDL is output in direct in the step S87. Moreover, even when the logical arithmetic process where the fourth parameter of the set attribute instruction 4 is never 7 or 13 is designated, it indicates the process other than the object for conversion to the clip instruction and therefore the process goes to the step S87 and the current PDL is output in direct.

When the instruction read in the step S63 is not the set attribute instruction, whether it is the drawing instruction for the figure shape or not is determined in the step S74. When the instruction is the figure shape drawing instruction such as drawrect instruction or drawellipse instruction, the process goes to the step S75 in order to store in direct the instruction to the buffer. When an instruction which is never set attribute instruction or figure shape drawing instruction appears, conversion to the clip instruction is never conducted and the process goes to the step S87 in order to output in direct the current PDL.

When the instruction read in the step S63 is the set attribute instruction to designate the DSx arithmetic process (No. 7) or when the over-writing (No. 13) is designated and value of color is 0 and condition is b, c and when the instruction is the figure shape drawing instruction, instruction is stored in the buffer in the steps S75 to S83. Namely, when it is determined that the condition is b in the step S75, the COUNT1 variable is increased by one in the step S76 and the instruction is stored in the buffer 1 in the step S77. Simultaneously, when the condition is determined as c in the step S78, the COUNT2 variable is increased by one in the step S79 and the instruction is stored to the buffer 2 in the step S80. After the instruction is stored to the buffer 1 or buffer 2 in the steps S77, S80, the process returns to the step S62 to determine condition of reading by returning to the step S62. Thereafter, the process for the next instruction is started.

Moreover, when the condition is determined as d in the step S81, the COUNT3 variable is increased by one in the step S82 and the instruction is stored to the buffer 3 in the step S83. In this case, a value of the COUNT3 variable is compared with the value of the COUNT1 variable in the step S84. When the value of COUNT3 variable is smaller than the value of COUNT1 variable, namely than the number of instructions for the DSx arithmetic process existing before drawing of the figure having the color value 0, the process returns to the step S62 to execute the process of the next instruction. When the value of COUNT3 variable becomes equal to the value of COUNT1 variable, it is detected in the step S85 and whether actual replacement is possible or not is determined in the step S86 under the condition that the instruction train which may be replaced with the clip instruction is detected. When replacement is possible, the replacement process is conducted. After the process of the step S86, the process returns to the step S61 to detect the train of replaceable instructions.

When the value of the COUNT3 variable becomes larger than the value of the COUNT1 variable, conversion to the clip instruction is impossible. Therefore, the current PDL is output in direct in the step S87. Moreover, when the condition is a, the current PDL is output in direct in the step S87 without storing to the buffer. After the PDL is output in the step S87, the process returns to the step S61 to repeat the process to detect the train of the new replaceable instructions.

Finally, when reading is no longer continued because there is no drawing instruction to be read, for example, the current PDL is output in direct in the step S88 to complete the process.

In case whether actual replacement is possible or not is determined in the step S86, when such replacement is possible, the process to execute the replacement is illustrated in FIG. 15. In the step S91, contents of buffer 1 and buffer 3 are compared. The number of instructions stored in the buffer 1 and buffer 3 is indicated by the COUNT1 variable or COUNT3 variable. In the step S92, whether content of the buffer 1 is matched with that of the buffer 3 or not is determined, in the step S92, as a result of comparison of step S91. When contents are matched, it indicates that the logical arithmetic process is conducted twice with the exclusive logical arithmetic process for the same source image. Moreover, in the process of FIG. 13 and FIG. 14, it is also known that drawing of figure with the color having the value 0 is conducted between the train of instructions of these exclusive logical sum. Therefore, the train of detected instructions may be determined to allow the replacement using the clip instruction.

Upon reception of the determination, train of instructions may be converted to the train of drawing instructions using the clip instruction in the step S93. Namely, the startclip instruction is output, figure shape drawing instruction (command/parameter) stored in the buffer 2 is output and the endclip instruction is also output. Moreover, the logical arithmetic code is changed to No. 13 (arithmetic process for overwriting as the source image) and is then output for all instructions (command/parameter) stored in the buffer 1. As explained above, the drawing instruction train can be converted to that not using the logical arithmetic process.

In the step s92, when content of buffer 1 is never matched with content of the buffer 2, it is not concluded that exclusive logical sum is conducted twice for the same source image, the conversion process is not conducted and all PDLs accumulated are output in direct in the step S94.

Conversion of the drawing instruction train to draw the practical example illustrated in FIG. 8, namely conversion process to PDL illustrated in FIG. 12 of PDL illustrated in FIG. 12A will then be explained. In FIG. 12A, the first line "set attribute 30 30 30 7" is read. In this case, the instruction is the set attribute instruction and the fourth parameter is the DSx arithmetic process (No. 7). Moreover, since the initial condition is a, the condition is changed to b in the step S67. Since the condition is changed to b, 1 is added to the COUNT1 variable in the step S76 and the instruction of the first line is stored in the buffer 1 in the step S77. Thereafter, the process returns to the step S62.

The next instruction, namely "drawrect 50 10 70 90" of the second line in FIG. 12A is received. In this case, it is not the set attribute instruction but is the figure shape drawing instruction. Moreover, since the condition is b, "1" is added to the COUNT1 variable in the step S76 and the instruction of the second line is stored in the buffer 1 in the step S77. Thereafter, the process returns to the step S62.

The next instruction in the third line is the set attribute instruction and the fourth parameter is the DSx arithmetic process (No. 7), but since the condition is b, this condition is never changed and "1" is added tot the COUNT1 variable in the step S76 and the instruction of the third line is stored in the buffer 1 in the step S77. Thereafter, the process returns to the step S62.

As explained above, these two kinds of processes are repeated alternately until the $10_{th}$ line in FIG. 12A. Therefore, the drawing instructions up to the $10_{th}$ line are stored in the buffer 1.

Next, when the "set attribute 0 0 0 13" in the $11_{th}$ line is read, the fourth parameter is not DSx arithmetic process (No. 7), although the instruction is the set attribute instruction. However, since the fourth parameter is the No. 13 logical arithmetic code indicating the over-writing of the source image, condition and color are further determined. In the timing when this instruction is issued, condition is b and values of drawing color of this instruction R, G, B=0,0,0. Therefore, the condition is changed to c in the step S72. Since the condition is changed to c, "1" is added to COUNT2 variable in the step S79 and the instruction of the $11_{th}$ line is stored in the buffer 2 in the step S80. Thereafter, the process returns to the step S62. The drawellipse instruction in the next $12_{th}$ line is the instruction to draw a figure shape and therefore "1" is added to COUNT2 variable in the step S79 and this instruction is stored in the buffer 2 in the step S80.

Next, when the "set attribute 30 30 30 7" in the $13_{th}$ line is read, since the instruction is the set attribute instruction, the fourth parameter is the DSx arithmetic process (No. 7) and moreover the condition is c, the condition is changed to d in the step S69. Since the condition is changed to d, "1" is added to COUNT3 in the step S82 and the instruction of the $13_{th}$ line is stored in the buffer 3 in the step S83. Thereafter, the process returns to the step S62. Subsequently, the instructions in the lines from $14_{th}$ line to $22_{nd}$ line are also stored in the buffer 3 in the step S83 after addition of "1" to COUNT3 variable in the step S82.

When the instructions up to the $22_{nd}$ line are processed, COUNT1=10, COUNT2=2 and COUNT3=10. Since the value of COUNT1 variable is equal to that of COUNT3 variable, the process illustrated in FIG. 15 is executed.

Since the instruction train in the lines from $1_{th}$ to $10_{th}$ line is identical to that in the instruction train in the lines from $13_{th}$ line to $22_{nd}$ line in the drawing instruction train illustrated in FIG. 12A, it is determined that the instruction train may be converted to that using the clip process. In the step S93, following processes are executed.

(A) The startclip instruction is output.
(B) The figure drawing instructions and parameters in the buffer 2 are all output.
(C) The endclip instruction is output.
(D) Instructions and parameters in the buffer 1 are all output.

In this case, the fourth parameter designating the logical arithmetic process with the parameter of the set attribute instruction is changed to No. 13 (over-writing of source image).

A series of gradation drawing instruction using the logical arithmetic process illustrated in FIG. 12A is replaced as illustrated in FIG. 12B by executing four kinds of processes listed as (A) to (D). As explained above, the drawing instruction train illustrated in FIG. 12A including the logical arithmetic process can be converted to the drawing instruction train illustrated in FIG. 12B not including the logical arithmetic process. Thereby, the drawing processing rate can be much improved.

In the third practical example, it is presumed that the conversion process is conducted within the printer 20 in FIG. 1. However, the present invention is not limited thereto and the conversion process explained above may also be conducted in the printer driver 13 as in the case of the second practical example. Moreover, it is also possible to form the structure where the third practical example may be combined with the first and second practical example.

In addition, the third practical example has been explained on the basis of the image forming system as illustrated in FIG. 2, but the present invention is never limited thereto and may also be applied to the desired system structure including the image forming apparatus.

As is apparent from above explanation, the present invention is capable of executing the drawing instructions including the logical arithmetic process by converting these instructions to the commands not including the logical arithmetic process when it is not required to execute in direct the instructed logical arithmetic process and thereby assures high speed imaging process in which the time required for logical arithmetic process has been saved. Moreover, the present invention provides the effect to realize the image processing to assure high speed process and high quality image because disadvantage on image quality generated by color conversion process due to the logical arithmetic process may be avoided by not executing the logical arithmetic process.

What is claimed is:

1. An image processing apparatus to execute processes by receiving drawing instructions including instructions for logical arithmetic processes between pixels forming an image, comprising:

drawing instruction converting part that converts said drawing instructions to drawing object and drawing logical arithmetic process instruction;

drawing logical arithmetic process instruction determining part that determines whether said drawing logical arithmetic process instruction has the content which may be processed or not without the logical arithmetic process; and drawing object converting part that converts said drawing object and drawing logical arithmetic process instruction to the instruction and drawing object which do not require the drawing logical arithmetic process when said drawing logical arithmetic process instruction is determined, in said drawing logical arithmetic process instruction determining part, to have the content which may be processed without logical arithmetic process.

2. An image processing apparatus to conduct processes by receiving a drawing instruction including the instruction for logical arithmetic process between pixels forming an image, comprising:

drawing instruction converting part that converts said drawing instruction to drawing object and drawing logical arithmetic process instruction;

drawing object storing part that stores said drawing object and said logical arithmetic process instruction converted by said drawing instruction converting part;

drawing logical arithmetic process instruction determining part that determines whether a plurality of continuous drawing logical arithmetic process instructions stored in said drawing object storing part has the content which may be processed without logical arithmetic process or not; and drawing object converting part that converts a plurality of said continuous drawing logical arithmetic process instruction and said drawing object to the instruction which does not require the drawing logical arithmetic process and drawing object when a plurality of said continuous drawing logical arithmetic process instructions are determined to have content to be processed without logical arithmetic process in said drawing logical arithmetic process instruction determining part.

3. The image processing apparatus claimed in claim 1, further comprising:

background image data storing part that stores the background image data; and drawing logical arithmetic processing part that conducts logical arithmetic process between said background image data stored in said background image data storing part and said drawing object, depending on said drawing logical arithmetic process instruction and then writing back the result data to said background image data storing part.

4. The image processing apparatus claimed in claim 2, further comprising:

background image data storing part that stores the background image data; and drawing logical arithmetic processing part that conducts logical arithmetic process between said background image data stored in said background image data storing part and said drawing object, depending on said drawing logical arithmetic process instruction and then writing back the result data to said background image data storing part.

5. The image processing apparatus claimed in claim 3, wherein said drawing object is composed of at least one pattern of the mask pattern defining the shape and background pattern defining the complete painting pattern, and said drawing logical arithmetic processing part performs any process among the logical sum, logical product and exclusive logical sum for a couple of designated data among said mask pattern, back background pattern and said background image data.

6. The image processing apparatus claimed in claim 4, wherein said drawing object is composed of at least one pattern of the mask pattern defining the shape and background pattern defining the complete painting pattern, and said drawing logical arithmetic processing part performs any process among the logical sum, logical product and exclusive logical sum for a couple of designated data among said mask pattern, back background pattern and said background image data.

7. The image processing apparatus claimed in claim 3, wherein said drawing object is composed of at least one pattern of the mask pattern defining a shape and background pattern defining a complete painting pattern, and said drawing logical arithmetic processing part performs the combined arithmetic process of the logical sum, logical product and exclusive logical sum to a couple of designated data among said mask pattern, said background pattern and said background image data.

8. The image processing apparatus claimed in claim 4, wherein said drawing object is composed of at least one pattern of the mask pattern defining a shape and background pattern defining a complete painting pattern, and said drawing logical arithmetic processing part performs the combined arithmetic process of the logical sum, logical product and exclusive logical sum to a couple of designated data among said mask pattern, said background pattern and said background image data.

9. The image processing apparatus claimed in claim 1, wherein said drawing logical arithmetic process instruction determining part detects a particular drawing logical arithmetic process instruction and also determines whether the background pattern defining the mask pattern defining a shape or complete painting pattern is matched with the particular condition or not.

10. The image processing apparatus claimed in claim 2, wherein said drawing logical arithmetic process instruction determining part detects a particular drawing logical arithmetic process instruction and also determines whether the background pattern defining the mask pattern defining a shape or complete painting pattern is matched with the particular condition or not.

11. An image processing method for executing process by receiving a drawing instruction including logical arithmetic process between pixels forming an image, comprising the steps of:

converting said drawing instruction to a drawing object and a drawing logical arithmetic process instruction;

determining whether said drawing logical arithmetic process instruction has content to be processed without logical arithmetic process or not; and converting, when said logical arithmetic process instruction is determined to have content to be processed without logical arithmetic process, said drawing object and drawing logical arithmetic process instruction to the instruction and drawing object which do not require the logical arithmetic process.

12. An image process method for conducting process by receiving a drawing instruction including the logical arithmetic process instruction between pixels forming an image, comprising the steps of:

converting said drawing instruction to a drawing object and a drawing logical arithmetic process instruction;

determining whether a plurality of continuous drawing logical arithmetic process instructions have content to be processed without logical arithmetic process; and converting a plurality of said continuous drawing logical arithmetic process instruction and said drawing object to the instruction and drawing object not requiring drawing logical arithmetic process when a plurality of said continuous drawing logical arithmetic process instructions are determined to have content to be processed without logical arithmetic process.

13. The image processing method claimed in claim 11, wherein determination whether said drawing logical arithmetic process instruction has content to be processed without logical arithmetic process or not is identical, when said drawing logical arithmetic process instruction is determined as the particular drawing logical arithmetic process instruction, to determination whether the background pattern defining mask pattern defining a shape or complete painting pattern is matched with the particular pattern or not.

14. The image processing method claimed in claim 12, wherein determination whether said drawing logical arithmetic process instruction has content to be processed without logical arithmetic process or not is identical, when said drawing logical arithmetic process instruction is determined as the particular drawing logical arithmetic process instruction, to determination whether the background pattern defining mask pattern defining a shape or complete painting pattern is matched with the particular pattern or not.

* * * * *